A United States Patent [19]

Mitschang

[11] Patent Number: 4,541,674
[45] Date of Patent: Sep. 17, 1985

[54] LINEAR MOTION ROLLER BEARING

[76] Inventor: William Mitschang, 7 Rose St., Glen Head, N.Y. 11545

[21] Appl. No.: 583,525

[22] Filed: Feb. 24, 1984

[51] Int. Cl.⁴ .................... F16C 29/06; F16C 29/04
[52] U.S. Cl. ..................................... 308/6 C; 308/6 R
[58] Field of Search ............... 308/6 C, 6 R, 3 R, 3 A

[56] References Cited

U.S. PATENT DOCUMENTS

| | | | |
|---|---|---|---|
| 3,330,606 | 7/1967 | Suda | 308/6 C |
| 3,512,849 | 5/1970 | Weisel | 308/6 C |
| 3,545,826 | 12/1970 | Magee | 308/6 C |
| 3,689,124 | 9/1972 | Irwin | 308/6 C |
| 3,692,371 | 9/1972 | Geffner | 308/6 C |
| 3,767,276 | 10/1973 | Henn | 308/6 C |
| 3,879,093 | 4/1975 | Betrix | 308/6 C |
| 3,891,284 | 6/1975 | Ernst et al. | 308/6 C |
| 3,951,472 | 4/1976 | Schurger et al. | 308/6 C |
| 3,951,473 | 4/1976 | Olschewski et al. | 308/6 C |
| 3,955,857 | 5/1976 | Schurger et al. | 308/6 C |
| 3,958,678 | 5/1976 | Jeter | 308/6 C |
| 3,967,865 | 7/1976 | Walter et al. | 308/6 C |
| 3,975,064 | 8/1976 | Nilsson | 308/6 C |
| 4,005,913 | 2/1977 | Thomson, Jr. | 308/6 C |
| 4,062,602 | 12/1977 | Nilsson | 308/6 C |
| 4,073,547 | 2/1978 | Lundgren et al. | 308/6 C |
| 4,108,503 | 8/1978 | Ernst et al. | 308/6 C |
| 4,108,504 | 8/1978 | Ernst et al. | 308/6 C |
| 4,118,078 | 10/1978 | Ernst et al. | 308/6 C |
| 4,128,278 | 12/1978 | Headen et al. | 308/3 A |
| 4,139,242 | 2/1979 | Ernst et al. | 308/6 C |
| 4,201,424 | 5/1980 | Ernst et al. | 308/6 C |
| 4,205,885 | 6/1980 | Ernst et al. | 308/6 C |
| 4,206,951 | 6/1980 | Ernst et al. | 308/6 C |
| 4,278,305 | 7/1981 | Olschewski et al. | 308/6 C |
| 4,311,348 | 1/1982 | Olschewski et al. | 308/6 C |
| 4,328,999 | 5/1982 | Olschewski et al. | 308/6 C |
| 4,334,716 | 6/1982 | Magee et al. | 308/6 C |
| 4,339,157 | 7/1982 | Olschewski et al. | 308/6 C |
| 4,372,623 | 2/1983 | Koschmieder | 308/6 C |

Primary Examiner—Stuart S. Levy
Assistant Examiner—Thomas R. Hannon
Attorney, Agent, or Firm—Nolte, Nolte and Hunter

[57] ABSTRACT

An improvement in linear rolling bearing assemblies having cylindrical outer sleeves with a central bore and a cage within such bore having outwardly extending projections which define a plurality of continuous ball circulation paths, each comprised of a longitudinal load channel and an adjacent longitudinal return channel. The improvement consists of a unitary cylindrical outer sleeve having longitudinal load-carrying lands and accompanying return channel grooves, the load-carrying lands straddled by the outwardly extending projections of the cage in such a way that restricted rotation of the cage relative to the sleeve is permitted. The return channel groove is formed in the bore of the outer housing by a substantially horizontal deformation from the load-carrying land which deformation is blended with a ball-conforming shape whereby guidance is provided the balls through the return channel. The case is a single unit made from a material selected from metal and plastic and can be simply assembled by inserting the cage in the sleeve to form the assembly.

4 Claims, 5 Drawing Figures

LINEAR MOTION ROLLER BEARING

BACKGROUND OF THE INVENTION

The present invention relates to the art of linear motion roller bearings, and, in particular, is directed to improved linear bearing construction which minimizes impeded dynamic travel of the bearing over an axial shaft.

A typical linear bearing presently known in the art includes an outer sleeve provided in its bore with axial lands for rolling elements under load and return passages for the elements not under load, a cage installed in the bore with a plurality of circumferentially distributed projections which form channels consisting of axial races for the loaded and non-loaded rolling elements, semi-circular turnarounds connecting the races to each other in pairs, endless rows of rolling elements arranged in the channels, and end rings fixed to the ends of the outer sleeve to close off the cage at the ends.

It is known in the art to prevent rotary displacement of the cage relative to the outer sleeve by providing irregular projections, e.g., bosses and/or axial fillers, between the cage and the sleeve.

For example, U.S. Pat. No. 4,328,999 discloses a linear motion rolling bearing having an outer sleeve and a cage with loaded and return races defined therebetween, and opposite end rings molded onto the outer sleeve and formed as a unitary structure with the outer sleeve by molding or casting onto the outer sleeve. The cage 6 has radial projections 16 and 16A shown in FIGS. 1 and 3, respectively, which geometrically lock the cage against rotation within the outer sleeve, and must be provided with injectable or castable material 10B and 19, respectively.

Similarly, U.S. Pat. No. 4,139,242 shows a ball bearing with a cylindrical ball cage intermediate a shaft and outer shell, and alternately spaced longitudinal load portions and ball-return paths. The bore of the shell also has additional longitudinal recesses for receiving, with a certain amount of play, mating longitudinal ribs, which permits restricted lateral and circumferential movement of the balls relative to the shell during longitudinal movement of these balls. Different embodiments of the disclosure of U.S. Pat. No. 4,139,242 provide for limiting rotational movement by other types of radial projections fashioned as axially extending ribs which engage, with play, corresponding recesses in the shell bore surface.

U.S. Pat. No. 4,206,951 discloses a linear roller bearing having an outer housing with a central bore with a plurality of radially-inward directed axially extending projections that form races for rolling elements under load, and surfaces between projections which serve as return races. The linear bearing also has a cage within the bore of the outer housing which has, among other features, axially extending projections in its outer surface extending into corresponding grooves in the outer housing to inhibit relative rotation between the cage and the outer housing.

U.S. Pat. No. 4,278,305 describes a linear motion bearing having an outer sleeve, the bore of which houses the cage and endless rows of rolling elements. The cage has recesses which are occupied by race plates having an inner side engaging the loaded elements. Each race plate has a radial projection 13 which extends through a radial opening in the outer sleeve to maintain the plates in position.

As evident from the references described above, as well as knowledge in the art in general, in order to provide an unencumbered return path for rolling elements, relatively convoluted design features must be integrated into the primary structural elements forming the loaded and unloaded paths, and/or filler materials and/or multiple piece assembly which require time and attention, whether manual or mechanical, must be employed to effect construction. Moreover, it is believed that in the linear bearing assemblies known to date, encumbered travel over an axial shaft because of ball stagger is experienced.

It is an object of the present invention, therefore, to provide a linear bearing which overcomes the deficiencies noted above as well as other problems associated with construction and use of the linear bearings.

BRIEF DESCRIPTION OF THE INVENTION

The present invention is an improved linear rolling bearing assembly having a cylindrical outer sleeve with a central bore, a cage within the bore having outwardly extending projections, the interior surface of the bore and the cage projection defining a plurality of continuous ball circulation channels, each of which is composed of an axially-extending loaded channel and an axially-extending non-loaded return channel. The loaded channel and the return channel are connected by two semi-circular channels at either end of the loaded and non-loaded channels. The continuous ball circulation paths are designed for use of load-carrying balls.

The improvement includes a unitary cylindrical outer sleeve having longitudinal load-carrying lands and accompanying return channel grooves. The load-carrying lands are straddled by the outwardly extending projection of the cage so that restricted rotation of the cage relative to the outer sleeve is permitted. The return channel groove is formed in the bore of the sleeve such that it forms a substantially horizontal deformation from the load-carrying land and is blended with a ball-conforming shape whereby guidance is provided the balls through the return channel.

Preferably, the cage is also a single unit made from a material such as metal or plastic, and is preferably made from plastic. The unitary cage element can conveniently be inserted into the sleeve to form the linear rolling bearing assembly. As a result of this simplistic and unique construction, a linear roller bearing assembly can be made by simply inserting the unitary cage into the outer sleeve element followed by loading the paths with the desired number of rolling elements, such as ball bearings, and closing the loading end with a plastic or metal ring as desired.

The cumulative effect of this construction tends to keep all of the balls comprising a circuit as close to center, one ball to the other, as possible, thereby minimizing "ball stagger" which is normally associated with a chain of balls driven by a ball leaving the working or load area. Moreover, this unique characteristic is believed to result from the ball ceiling provided by the outer shell which is essentially planar from the load-carrying land.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
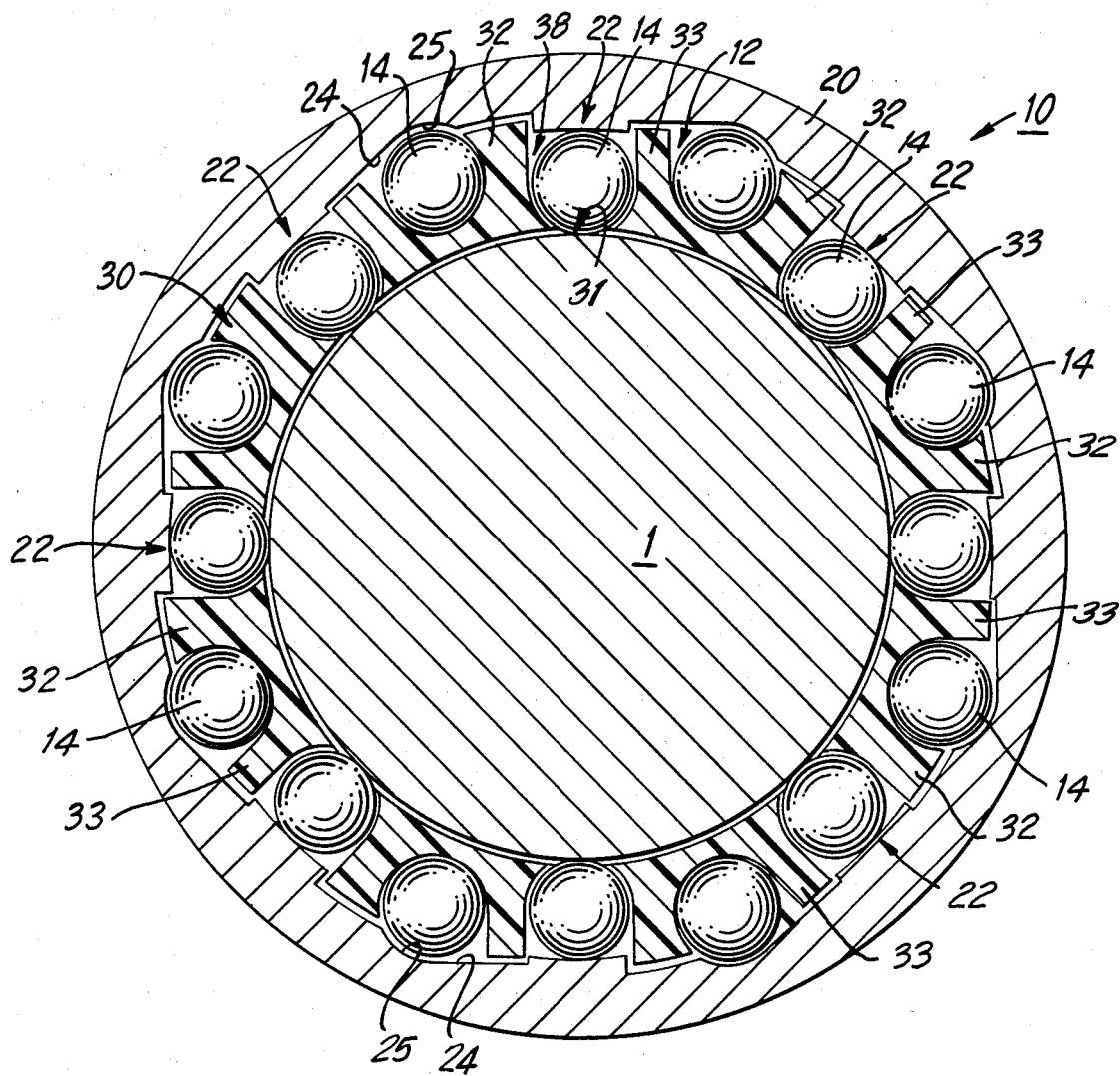
FIG. 1 is a side elevation of a cross section taken 90° to the axis of the linear bearing assembly according to the present invention.

Referring to FIG. 1, there is shown a cross section of the bearing assembly of the present invention shown at an angle of 90° from the axis of the bearing unit. The overall bearing assembly 10 has two primary components, outer housing 20 and inner cage portion 30, both of which are preferably of unitary design. The outer housing can be conveniently made by machining a cast or molded metal tube, and, the cage element can be either metal or plastic, but is preferably a molded or cast plastic piece.

Figure 3:
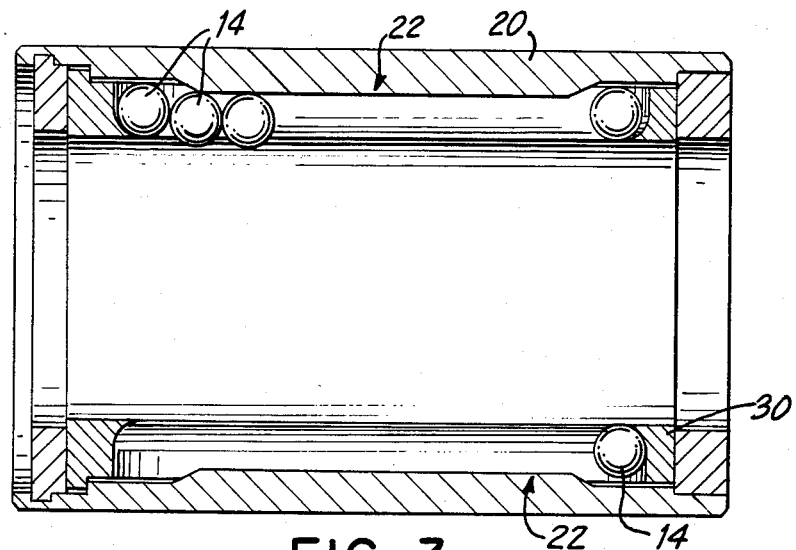
FIGS. 3 and 4 are a side elevation views of a cross section taken along the axis of a linear bearing assembly according to two embodiments of the present invention.
Figure 4:
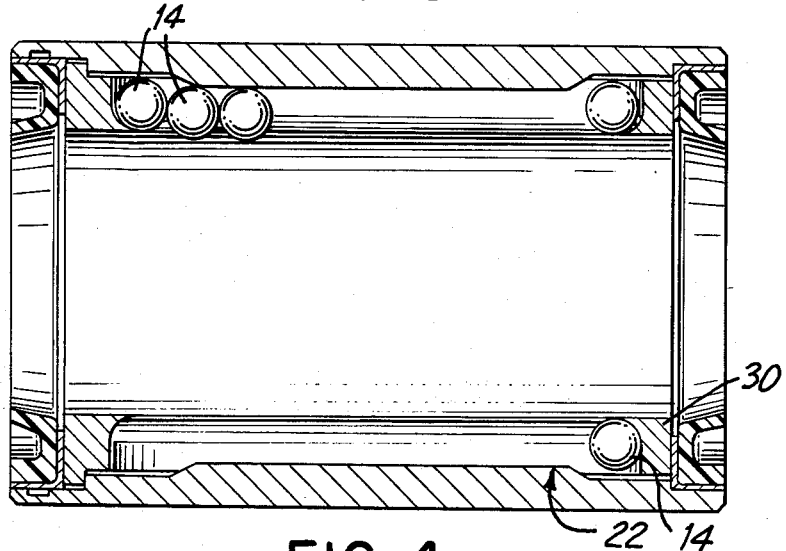

The outer housing is formed with radially depending load-carrying lands 22 which extend axially substantially the entire length of the linear bearing, as can be seen in FIGS. 3 and 4. The inner surface of load-carrying lands 22 located on the interior surface of the bore of outer housing 20 rests directly on roller elements, ball bearings 14, which, in turn, bear directly on axial shaft 1 through cage openings or tracks 31.

Figure 2:
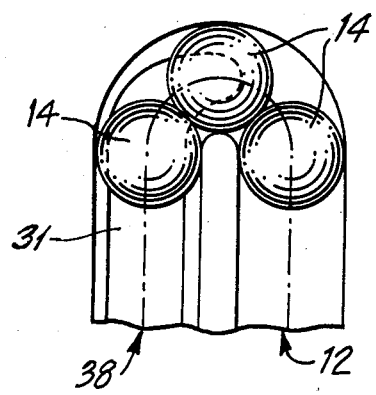
FIG. 2 is a flattened view of an end portion of the cage portion of the bearing assembly with a series of rolling elements travelling between the loaded track portion and the unloaded return channel portion.

The inner surface of the bore of outer housing 20 is also formed with a surface 24, slightly outwardly of and extending (in FIG. 1) clockwise substantially parallel to land 22, which also includes a substantially curved portion 25 to accommodate and provide guidance for ball bearings 14 in an unloaded or return path 12 formed between the outer housing and the cage. The cage 30 is constructed of a plurality of outwardly extending radial projections 32 and 33 which form load channels 38 and unloaded channels 12. The projections 32 and 33 are spaced apart from one another sufficiently to capture load-carrying land 22 therebetween with a restricted amount of rotational movement or play provided between cage 30 and outer housing 20. Referring to FIG. 2, the path of the load-carrying ball units 14 is depicted as they leave the loaded condition in load-bearing channel 38 and enter the non-loaded return channel 12.

As a consequence of the present construction, the ball circuit formed by the cage and outer housing is on a horizontal plane i.e., outwardly of and parallel to the land 22, having closely controlled ball guidance, which minimizes and/or eliminates "ball stagger" within reasonable limits, resulting in a smooth "non-stick" or "non-jerky" dynamic movement. It is believed that one of the factors contributing to this smooth dynamic movement is the ability of a ball to pass from the loaded condition and loaded portion of the path to the unloaded or free portion of the path with a minimal amount of retardation or interruption in continuous rolling which would otherwise result from, among other things, unbalanced torque exerted at the point or transition between the loaded and unloaded condition.

Furthermore, as a result of the limited amount of rotational movement allowed between cage 30 and housing 20, the roller bearings are allowed to rotate slightly in all directions, thereby preventing eventual excessive wear on limited loading points on the ball bearings.

Figure 5:
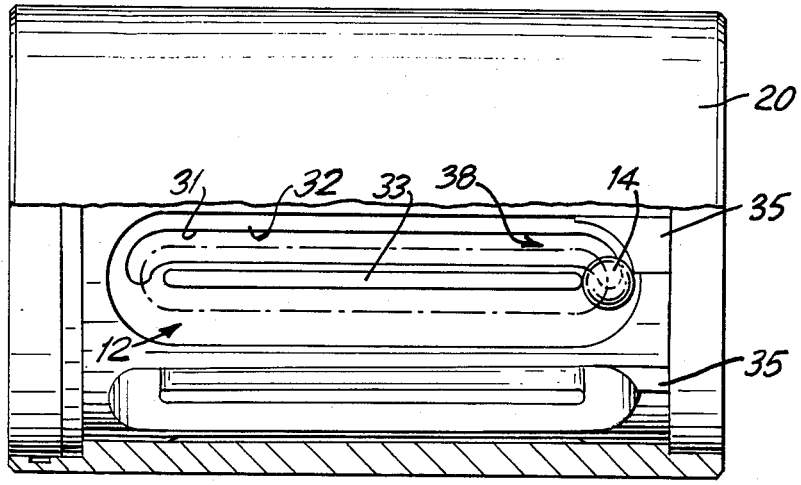
FIG. 5 is a top view of the length of the linear bearing assembly with a portion of the outer housing cut away to show the cage portion assembled therein.

Referring to FIGS. 3 and 4, it can be seen that the cage can be held on the ends by a plastic or steel ring (FIG. 3) or a seal (FIG. 4), trapping the cage from axial movement relative to the outer housing. As noted above, the cage is held rotationally by the side wall of the load path straddling the working lands 22 of the outer housing, while the unloaded path formed by the partially curved ceiling 25 in combination with the ceiling parallel with the land 24 maintains constant guidance, i.e., at least three point guidance, on the ball before the ball returns to the loaded side of the circuit. The outer housing is made to allow either a plastic or steel ring to snap into a groove on one end while a plastic or metal ring can be pressed or snapped into a groove at the other end. (Allowance must be made for seals to be pressed in on both ends of bearing for applications where seals are necessary.) Cage portions 30, on the other hand, are conveniently made with a slight relief aligned with the lead bearing channels 38 and lands, 35 in FIG. 5, at one end of axial projections 32 and 33 to facilitate assembly of the bearing unit by insertion of the cage into the housing unit.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. In a linear roller bearing assembly having a cylindrical outer sleeve with a central bore, a cage within said bore having outwardly extending axial projections, said bore and said cage projections defining a plurality of continuous ball circulation paths, each of said circulation paths comprising an axially-extending load-bearing channel in said bore, an axially-extending non-loaded return channel laterally adjacent said load-bearing channel, and two semi-circular channels interconnecting said load-bearing channel and said return channel, and load-carrying balls which are guided in said continuous ball circulation paths, the improvement comprising:

said cylindrical outer sleeve comprising a unitary cylindrical outer sleeve having axially-extending load-carrying flat lands, extending radially inwardly of said outer sleeve, each said flat land forming a part of a respective load-bearing channel, and accompanying return channel grooves, each said return channel groove forming a part of a respective non-loaded return channel, each said return channel groove having a substantially flat deformation lying outwardly of and extending laterally from and substantially parallel with a respective land and being blended with a curved ball-conforming shape along the axial length thereof laterally outwardly of said respective land, whereby guidance is provided to said balls through said return channel, said cage comprising a unitary cage within said outer sleeve, said outwardly extending axial projections of said cage being spaced from each other a distance and having outwardly extending lengths so that a respective load-carrying land is straddled between one said axial projection separating laterally adjacent load-bearing and non-loaded return channels of a respective circulation path and another said axial projection forming a lateral outer wall of said load-bearing channel of said circulation path, with some play, said projections forming at their axially extending inner portions load-carrying axially extending depressions and non-loaded axially-extending depressions, each said load-carrying depression being located directly opposite a respective land and having an opening in the axial direction for bearing of said load-carrying balls on a loaded surface and said respective land, and each of said non-loaded axially-extending depressions being formed so that it is located directly opposite a respective return channel groove, the laterally outward side thereof being curved along the same curvature as the ball conforming shape of a respective laterally outward axial length of a respective return channel groove.

2. The linear bearing assembly of claim 1, wherein said cage is made from a material selected from the group consisting of metal and plastic.

3. The roller bearing of claim 2, wherein said material is plastic.

4. The roller bearing of claim 1, wherein said cage is inserted into said sleeve to form said assembly.

* * * * *